United States Patent
Mussro

(10) Patent No.: US 8,760,309 B2
(45) Date of Patent: Jun. 24, 2014

(54) FUEL CELL COMPRESSOR AIR BEARING WEAR SENSOR

(75) Inventor: Joseph Vyas Mussro, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 252 days.

(21) Appl. No.: 13/310,914

(22) Filed: Dec. 5, 2011

(65) Prior Publication Data

US 2013/0142674 A1   Jun. 6, 2013

(51) Int. Cl.
*G08B 21/00* (2006.01)
*F16C 17/02* (2006.01)
*F16C 17/04* (2006.01)
*F16C 17/00* (2006.01)

(52) U.S. Cl.
CPC ............. *F16C 17/024* (2013.01); *F16C 17/042* (2013.01); *F16C 17/00* (2013.01)
USPC ........... 340/679; 340/664; 340/680; 340/682; 340/686.2; 340/686.4; 340/687

(58) Field of Classification Search
None
See application file for complete search history.

(56) References Cited

U.S. PATENT DOCUMENTS

| | | | | |
|---|---|---|---|---|
| 4,925,321 A | * | 5/1990 | Maruyama et al. | 384/114 |
| 4,941,105 A | * | 7/1990 | Marangoni | 702/42 |
| 6,948,853 B2 | * | 9/2005 | Agrawal | 384/105 |
| 7,108,488 B2 | * | 9/2006 | Larue et al. | 417/407 |
| 8,100,586 B2 | * | 1/2012 | Ruggiero et al. | 384/103 |
| 2001/0004408 A1 | * | 6/2001 | Schliephack et al. | 384/276 |
| 2003/0137294 A1 | * | 7/2003 | Gleixner et al. | 324/207.17 |
| 2007/0246002 A1 | * | 10/2007 | Taniguchi et al. | 123/246 |
| 2010/0001718 A1 | * | 1/2010 | Howard et al. | 324/207.15 |
| 2012/0007591 A1 | * | 1/2012 | Howard et al. | 324/207.15 |
| 2013/0011211 A1 | * | 1/2013 | Heshmat et al. | 408/56 |
| 2013/0216167 A1 | * | 8/2013 | Flora et al. | 384/103 |

* cited by examiner

*Primary Examiner* — Julie Lieu
(74) *Attorney, Agent, or Firm* — Dinsmore & Shohl LLP

(57) ABSTRACT

A wear sensor system, compressors using the wear sensor system and methods of detecting wear on a bearing. The wear sensor system includes a stationary housing-mounted circuit comprising a first inductor electrically connected to a voltage source and a rotating shaft-mounted circuit comprising a second inductor electrically connected to a capacitor. When there is no metal-to-metal contact between the shaft of the compressor and the housing into which the shaft is mounted, the housing-mounted circuit inductively charges the shaft-mounted capacitor and reduces a current level when the shaft mounted capacitor is charged. Likewise, when there is metal-to-metal contact between the shaft and the housing (which is indicative of bearing wear), the shaft-mounted circuit is grounded; this causes the housing-mounted circuit to increase the current level. This increased current level may be output to a suitable device for display or other indicia of bearing wear.

21 Claims, 3 Drawing Sheets

FUEL CELL COMPRESSOR AIR BEARING WEAR SENSOR

This invention relates generally to fuel cells, and more particularly to sensors for detecting air bearing wear in compressors for fuel cells.

In many fuel cell systems, hydrogen or a hydrogen-rich gas is supplied through a flow-field to the anode side of a fuel cell while oxygen (such as in the form of fuel cell. An appropriate catalyst (for example, platinum) is typically disposed as a layer on porous diffusion media that is typically made from a carbon fabric or paper such that it exhibits resiliency, electrical conductivity, and gas permeability. The catalyzed diffusion media is used to facilitate hydrogen oxidation at the anode side and oxygen reduction at the cathode side. An electric current produced by the dissociation of the hydrogen at the anode is passed from the catalyzed portion of the diffusion media and through a separate circuit such that it can be the source of useful work, while the ionized hydrogen passes through the membrane to combine with ionized oxygen at the cathode to form high temperature water vapor as a reaction byproduct. In one form of fuel cell, called the proton exchange membrane or polymer electrolyte membrane (in either event, PEM) fuel cell, an electrolyte in the form of a perfluorinated sulfonic acid (PFSA) ionomer membrane (such as Nafion®), is assembled between the diffusion media of the anode and cathode. This layered structure is commonly referred to as a membrane electrode assembly (MEA), and forms a single fuel cell. Many such single cells can be combined to form a fuel cell stack, increasing the power output thereof.

Compressors may be used to increase delivery of the reactants to the fuel cell stack. For example, a centrifugal compressor may be used to increase the pressure, quantity or velocity of oxygen-containing air to the cathode side of the fuel cell stack. The bearings used to facilitate relative rotation between various components, such as shafts, impellers (or rotors) and housings (or stators) are subject to wear and potential failure. Such bearing failure can cause significant problems, including the release of debris that, if liberated into the reactant flowpath, could damage the sensitive fuel cell components, as well as other downstream components.

SUMMARY OF THE INVENTION

In accordance with the teachings of the present invention, one aspect of the invention is a wear sensor system. In one embodiment, the wear sensor system includes a stationary housing-mounted circuit comprising: an inductor electrically connected to a voltage source; a rotating shaft-mounted circuit comprising; an inductor electrically connected to a capacitor; the housing-mounted inductor having a noncontact inductive coupling to the rotating shaft; wherein when there is no metal-to-metal contact, the housing-mounted circuit inductively charges the shaft-mounted capacitor and reduces a current level when the shaft mounted capacitor is charged; and when there is metal-to-metal contact, the shaft-mounted circuit is grounded causing the housing-mounted circuit to increase the current level.

Optionally, the wear sensor system also includes a diode bridge electrically connected between the second inductor and the capacitor. The wear sensor system may also include a current sensor that can be used to indicate the increased current level being output by the system. Such a sensor can be configured to deliver visual indicia, such as a current level or current change, or it can be configured to provide indicia in some other format, such as an aural warning. In one preferable form, the voltage source is an alternating current (AC) voltage source. In another preferable form, the construction of the area between the rotating shaft and the bearing housing is such that the wear sensor includes a foil between the housing and the shaft, where the foil includes a coating on the surface that faces the shaft; in one form, the coating is polytetrafluoroethylene (PTFE). In one form, the foil may be made of a high temperature metal. In particular, the foil may be supported on a compliant support structure between the shaft and housing such that a gap between the foil and the shaft is less than 0.0005 inches. In one form of compliant structure, a spring-like bump foil may be used.

Another aspect of the invention is a compressor with a wear sensor system. In one embodiment, the compressor includes a stationary bearing housing, a rotating shaft mounted in the housing with a gap between the shaft and the housing, an impeller mounted on the shaft, a circuit mounted on the housing and including an inductor electrically connected to a voltage source, a circuit mounted on the shaft and including an inductor electrically connected to a capacitor. Preferably, the inductor mounted on the housing is in a noncontact inductive relationship with the shaft such that when there is no metal-to-metal contact between the shaft and the housing, the circuit mounted on the housing inductively charges the capacitor to reduce a current level (or keep the current level low) when the capacitor is charged. Likewise, when there is metal-to-metal contact, the circuit mounted on the shaft is grounded causing the circuit mounted on the housing to increase the current level.

Such a compressor and wear sensor is particularly useful in a fuel cell system in general, and in a mobile fuel cell system in particular, where a fuel delivery system (made up of fuel source and oxygen source), fuel processing system, fuel cell stack, drivetrain and one or more motive devices (such as a wheel) energy storage devices (which can be in the form of one or more batteries, capacitors, electricity converters, or even a motor to convert the electric current coming from the fuel cell stack into mechanical power such as rotating shaft power) can cooperate to operate the drivetrain as a way to propel the vehicle. The fuel cell stack is made up of numerous fuel cells that each include an anode, cathode and electrolyte layer disposed between the anode and cathode. As mentioned above, a compressor (such as one made in accordance with the present invention) may be used to feed reactant to the anodes or cathodes of the various fuel cells making up the stack.

Optionally, an in addition to some of the optional features previously mentioned, a current sensor or related instrument may be used to provide visual indicia of changes to the current level. As mentioned above, various voltage sources may be used, as can shaft-to-housing coupling through foil or the like.

Yet another aspect of the invention is a method of detecting wear on a fuel cell bearing is disclosed. In one embodiment, the method includes providing a wear sensor system with a stationary housing-mounted circuit and a rotating shaft-mounted circuit, and outputting a signal during shaft rotation such that if there is metal-to-metal contact, the shaft-mounted circuit becomes grounded, thereby causing the housing mounted circuit to increase the current level. The stationary housing-mounted circuit has a first inductor electrically connected to a voltage source and in a noncontact inductive coupling to the rotating shaft, while the rotating shaft-mounted circuit has a second inductor electrically connected to a capacitor.

Optionally, the method further includes sending the outputted signal to a sensor when the current level increases. Such outputted signal may be in any well-known form, such as visually (such as through a readout, display or output data), aurally (such as through a warning or related signal) or other formats.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

The invention involves a sensor system to detect compressor bearing wear and/or intermittent rotating assembly contact with its housing. The sensor system can be made with inexpensive, readily available components, and diagnoses compressor contact events effectively. Early detection of compressor bearing failure allows real-time changes to system operating conditions in order to minimize compressor stress, as users can be alerted to potential failure and take corrective action. Thus, the sensor system provides improved compressor durability.

The wear sensor system is a combination of a housing-mounted circuit and a shaft-mounted circuit. The stationary housing mounted circuit inductively couples charge onto the rotating shaft-mounted circuit on the compressor rotor shaft. When there is no metal-to-metal contact, the housing mounted charging circuit fills the shaft-mounted capacitor mentioned above. The capacitor-charging draws very low power (for example, only in the milliwatt range). Even when the capacitor is fully charged, the charging circuit still oscillates, but also at very low power since no additional charge can be coupled into the capacitor. The circuit is automatically self-regulating: the more charge is left in the capacitor, the less power is required in the charging circuit.

If metal-to-metal contact occurs during compressor operation, the shaft mounted circuit is grounded, and the capacitor's charge is depleted causing the capacitor voltage to drop. The capacitor voltage drop causes the housing-mounted circuit to increase its power level in order to charge the capacitor again. The increase in power level triggers a sensor within the housing mounted circuit to indicate that contact has been made. The sensor could be a current sensor that senses the oscillator current.

Figure 1:
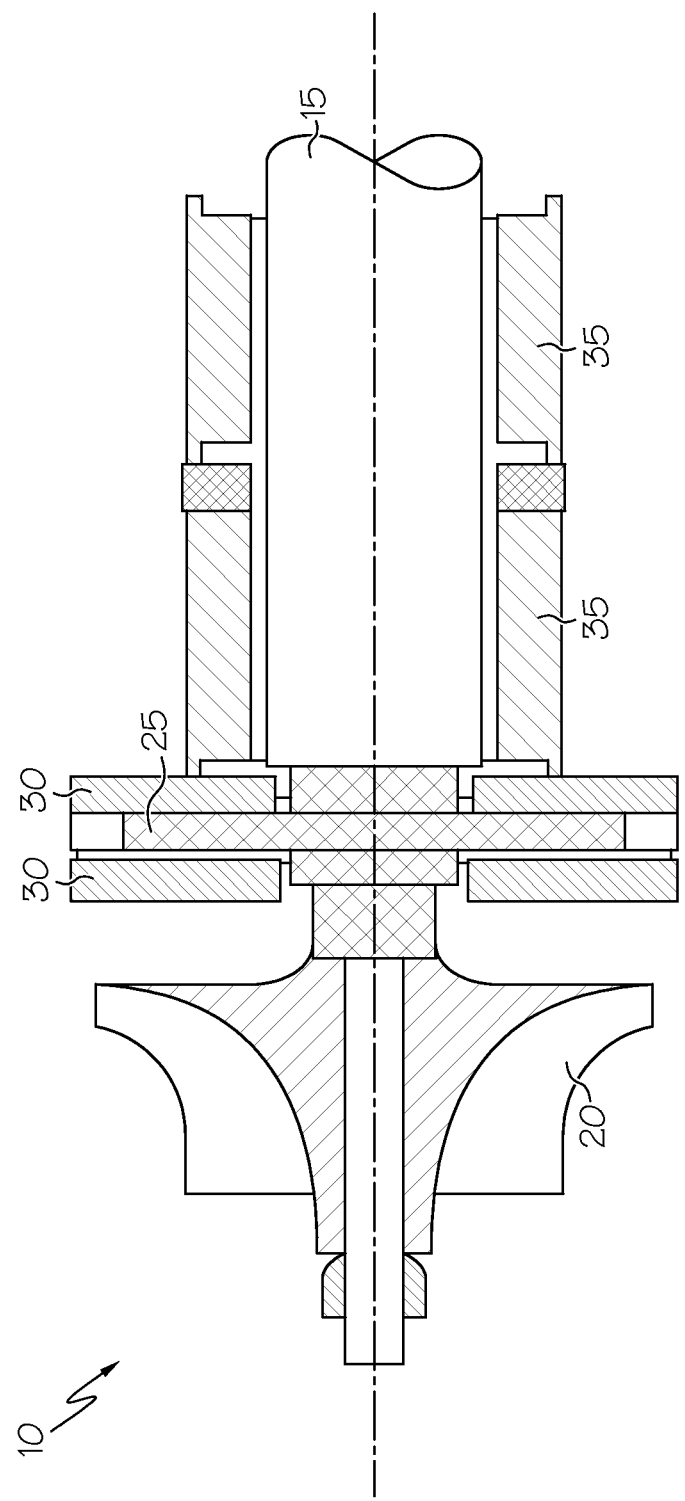
FIG. 1 illustrates the rotating component of a typical fuel cell centrifugal compressor.

Referring first to FIG. 1, an illustration of the rotating component 10 of a typical fuel cell compressor is shown. The shaft 15 is joined to the impeller 20 by a thrust runner 25. The thrust runner 25 has thrust air bearings 30 on either side. There are journal air bearings 35 around the shaft 15.

Figure 2:
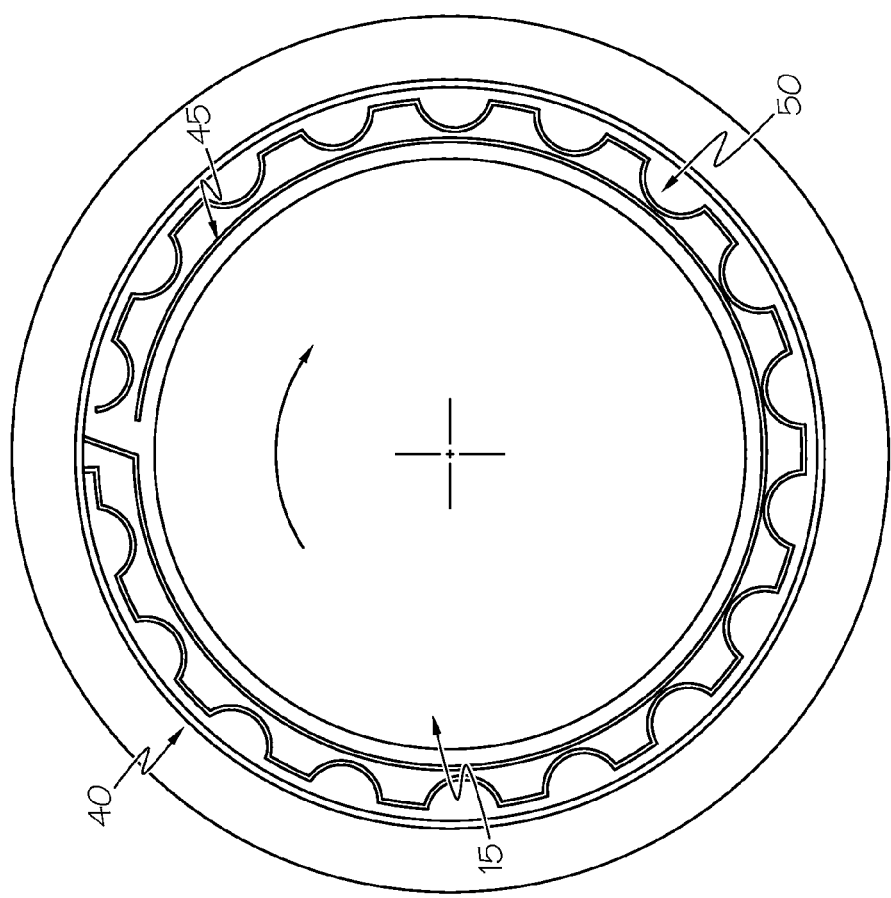
FIG. 2 illustrates a typical air journal bearing design.

Referring next to FIG. 2, a typical air journal bearing design is shown. The shaft 15 rotates inside the bearing housing 40, which does not rotate. There is a top foil 45 between the shaft 15 and the bearing housing 40. The top foil 45 is generally a high temperature metal, such as Inconel®. The top foil 45 typically has a coating of a low friction, high temperature stable, nonconductive polymer on it. Suitable polymers include, but are not limited to, PTFE. The top foil 45 is supported on a compliant support structure 50 (bump foil). There is an air gap between the shaft 15 and the top foil 45, which is generally less than 0.0005 in. The bump foil provides two functions to the bearing: compliancy and damping. With respect to compliancy, as the speed of the shaft increases, the gas pressure increases between the shaft and the top foil. This pushes the top foil away from the shaft. As the top foil is pushed away, it pushes against the bump foil. This causes the bump foil to compress between the top foil and the housing. This compliancy also allows for minor misalignment during rotation. As to damping, the surface friction forces between the top foil and the bump foil and the housing and bump foil will dampen vibration energy during rotation of the shaft.

Figure 3:
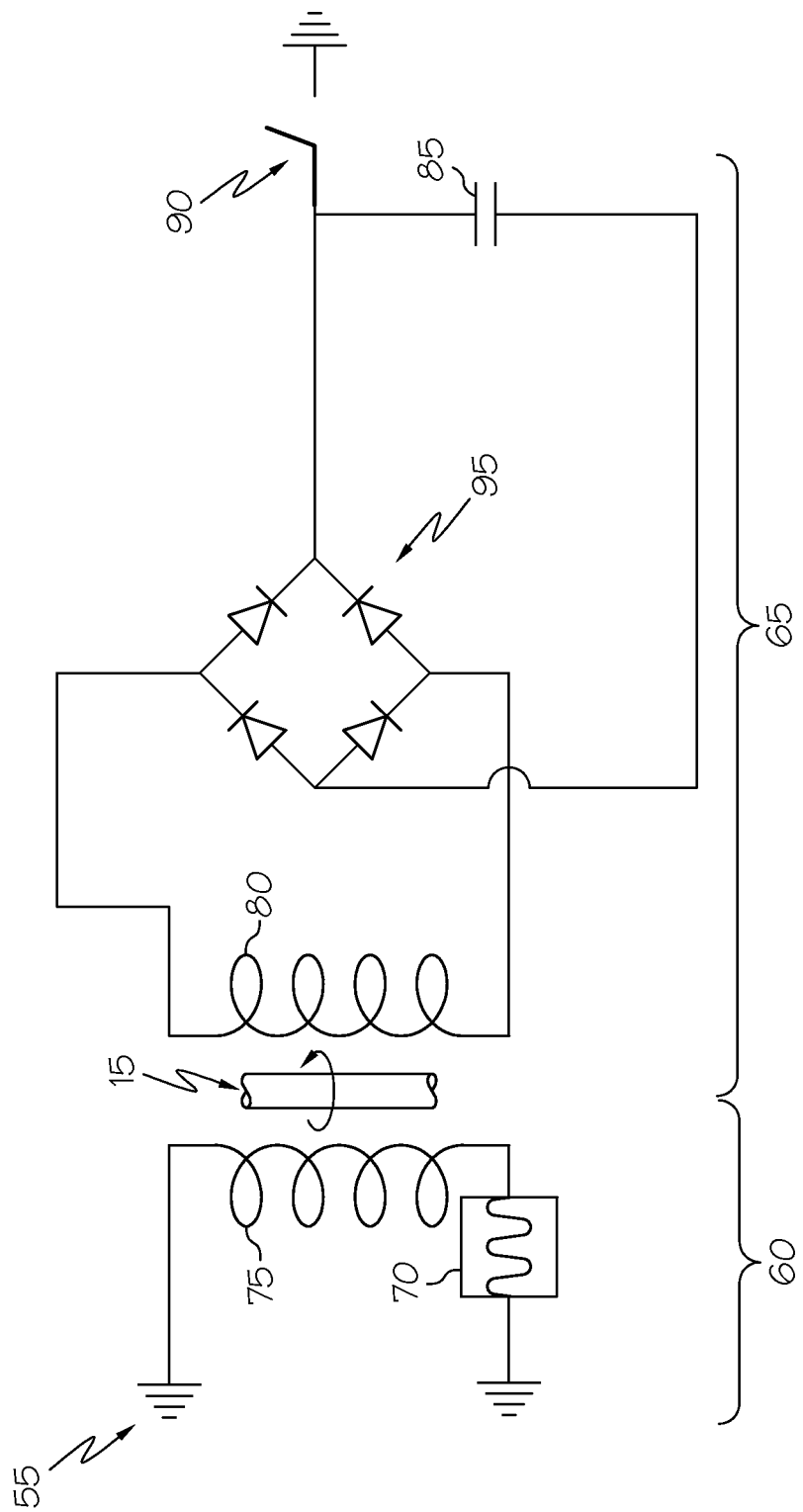
FIG. 3 shows one embodiment of the sensor system of the present invention that may be applied to the rotating component of FIG. 1 and the air journal bearing of FIG. 2.

Referring next to FIG. 3, an illustration of the sensor circuit 55 for the air bearing 35 is shown. There is a stationary bearing housing mounted circuit 60 and a rotating shaft mounted circuit 65, where the stationary bearing housing mounted circuit 60 includes an AC voltage source 70 and an inductor 75. The rotating shaft mounted circuit 65 includes an inductor 80 connected to a capacitor 85 through a diode bridge 95. The stationary housing mounted circuit 60 has a noncontact inductive coupling to the rotating shaft 15. Rotating movement of shaft 15, which is due solely to a force from a motor (not shown) is shown notionally extending in a counterclockwise direction, although it will be appreciated by those skilled in the art that such rotational direction is merely a matter of design preference.

The stationary housing mounted circuit 60 inductively couples charge onto the rotating shaft-mounted circuit 65 on the compressor shaft 15. When no metal-to-metal component wear is present, the housing-mounted charging circuit 60 fills the shaft mounted capacitor 85 and the current in the housing mounted circuit becomes very low. During compressor operation, if metal-to-metal contact occurs, the shaft mounted circuit 65 is grounded at 90, causing the housing-mounted circuit to increase its power level, triggering the sensor output and indicating that contact has been made.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention Likewise, for the purposes of describing and defining the present invention, it is noted that the term "device" is utilized herein to represent a combination of components and individual components, regardless of whether the components are combined with other components. For example, a "device" according to the present invention may comprise an electrochemical conversion assembly or fuel cell, as well as a larger structure (such as a vehicle) incorporating an electrochemical conversion assembly according to the present invention. Moreover, the term "substantially" is utilized herein to represent the inherent degree of uncertainty that may be attributed to any quantitative comparison, value, measurement, or other representation. As such, it may represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A sensor system for detecting wear in a rotating shaft that is disposed in a housing, the system comprising:
   a stationary housing-mounted circuit comprising a first inductor electrically connected to a voltage source and in a non-contact inductive coupling to the shaft; and
   a shaft-mounted circuit cooperative with the housing-mounted circuit and comprising a second inductor electrically connected to a capacitor such that upon electrically-conductive contact between the shaft and the housing, the shaft-mounted circuit becomes grounded, thereby causing the housing-mounted circuit to increase a current level.

2. The wear sensor system of claim 1, further comprising a diode bridge electrically connected between the second inductor and the capacitor.

3. The wear sensor system of claim, 1 further comprising a current sensor indicating the increased current level.

4. The wear sensor system of claim 1, wherein the voltage source is an alternating current voltage source.

5. The wear sensor system of claim 1, further comprising a foil between the housing and the shaft, the foil having an electrically nonconductive coating disposed on at least one surface thereof to preclude electrically-conductive contact between the shaft and the foil so long as the electrically nonconductive coating remains present.

6. The wear sensor system of claim 5, wherein the coating is polytetrafluoroethylene.

7. The wear sensor system of claim 5, wherein the foil is made of a high temperature metal.

8. The wear sensor system of claim 5, wherein the foil is supported on a compliant support structure.

9. The wear sensor system of claim 5, wherein a gap between the foil and the shaft is less than 0.0005 inches.

10. A compressor with a wear sensor system comprising:
    a housing;
    a rotating shaft mounted in the housing and defining a gap therebetween;
    an impeller mounted on the shaft;
    a circuit mounted on the housing comprising a first inductor electrically connected to a voltage source and mounted onto the housing in such a way to define a non-contact inductive coupling with the shaft; and
    a circuit mounted on the shaft and comprising a second inductor electrically connected to a capacitor, the circuit mounted on the shaft cooperative with the circuit mounted on the housing such that when there is metal-to-metal contact between the shaft and the housing through at least one bearing mounted to the housing, the circuit mounted on the shaft becomes grounded to cause the circuit mounted on the housing to increase a current level therethrough.

11. The compressor of claim 10, further comprising a diode bridge electrically connected between the second inductor and the capacitor.

12. The compressor of claim 10, further comprising a current sensor indicating the increased current level.

13. The compressor of claim 10, wherein the voltage source is an alternating current voltage source.

14. The compressor of claim 10, further comprising a foil between the housing and the shaft, the foil having an electrically nonconductive coating disposed on at least one surface thereof to preclude electrically-conductive contact between the shaft and the foil so long as the electrically nonconductive coating remains present.

15. The compressor of claim 14, wherein the coating is polytetrafluoroethylene.

16. The compressor of claim 14, wherein the foil is made of a high temperature metal.

17. The compressor of claim 14, wherein the foil is supported on a compliant support structure.

18. The compressor of claim 14, wherein a gap between the foil and the shaft is less than 0.0005 inches.

19. A method of detecting wear on a fuel cell compressor bearing, the method comprising:
    providing a wear sensor system comprising:
        a stationary housing-mounted circuit comprising a first inductor electrically connected to a voltage source, the housing-mounted inductor having a non-contact inductive coupling to rotatable shaft of the compressor; and
        a rotating shaft-mounted circuit comprising a second inductor electrically connected to a capacitor; and
    outputting a signal during rotation of the shaft such that when there is metal-to-metal contact between the rotating shaft and a housing to which the shaft is rotatably coupled, the shaft-mounted circuit becomes grounded to cause the housing-mounted circuit to increase a current level therethrough.

20. The method of claim 19, further comprising sending the outputted signal to a sensor when the current level increases.

21. The method of claim 20, wherein a value corresponding to the outputted signal is displayed on the sensor in visual form.

* * * * *